US010602071B2

(12) United States Patent
Takayama (10) Patent No.: US 10,602,071 B2
(45) Date of Patent: Mar. 24, 2020

(54) IMAGING DEVICE AND CONTROL METHOD

(71) Applicant: SONY SEMICONDUCTOR SOLUTIONS CORPORATION, Kanagawa (JP)

(72) Inventor: Katsumi Takayama, Saitama (JP)

(73) Assignee: SONY SEMICONDUTOR SOLUTIONS CORPORATION, Kanagawa (JP)

( * ) Notice: Subject to any disclaimer, the term of this patent is extended or adjusted under 35 U.S.C. 154(b) by 126 days.

(21) Appl. No.: 15/735,254

(22) PCT Filed: Jun. 3, 2016

(86) PCT No.: PCT/JP2016/066543
§ 371 (c)(1),
(2) Date: Dec. 11, 2017

(87) PCT Pub. No.: WO2016/203984
PCT Pub. Date: Dec. 22, 2016

(65) Prior Publication Data
US 2018/0183985 A1    Jun. 28, 2018

(30) Foreign Application Priority Data

Jun. 19, 2015  (JP) .................. 2015-124105

(51) Int. Cl.
*H04N 5/235*   (2006.01)
*H04N 5/369*   (2011.01)
(Continued)

(52) U.S. Cl.
CPC ......... *H04N 5/2352* (2013.01); *H04N 5/2351* (2013.01); *H04N 5/23206* (2013.01);
(Continued)

(58) Field of Classification Search
CPC .... H04N 5/2352; H04N 5/3696; H04N 5/332; H04N 5/23241; H04N 5/23206; H04N 5/2351; H04N 9/07
See application file for complete search history.

(56) References Cited

U.S. PATENT DOCUMENTS

| 8,149,294 B2* | 4/2012 | Konniya; Yasuhiro ..................... H04N 9/735 348/223.1 |
| 2006/0127081 A1* | 6/2006 | Lee ...................... G09G 3/3406 396/282 |

(Continued)

FOREIGN PATENT DOCUMENTS

| JP | 2005-191960 A | 7/2005 |
| JP | 2006-186723 A | 7/2006 |

(Continued)

OTHER PUBLICATIONS

International Search Report and Written Opinion of PCT Application No. PCT/JP2016/066543, dated Jul. 19, 2016, 10 pages of ISRWO.

*Primary Examiner* — Lin Ye
*Assistant Examiner* — John H Morehead, III
(74) *Attorney, Agent, or Firm* — Chip Law Group (57) ABSTRACT

The present disclosure relates to an imaging device and a control method that achieve low electric power consumption. A light source is of a wavelength received by an OPD pixel which is a pixel that detects light exposure, and its light emission is controlled by a PC or the like. The OPD pixel is a pixel specialized to detect a brightness of an imaging environment, and converts a received light amount to a current value, without electric power consumption, by utilizing photoelectric conversion. A detector detects a change (light intensity, light reception time, blinking pattern, etc.) of the current value of the OPD pixel, and upon detection, (Continued)

issues an operation instruction to another device (not depicted) or a solid state imaging device, by supplying a detection result to a control unit. The present disclosure can be applied to the solid state imaging device that includes the OPD pixel, for example.

10 Claims, 9 Drawing Sheets

(51) Int. Cl.
*H04N 5/232* (2006.01)
*H04N 5/33* (2006.01)
*H04N 9/07* (2006.01)

(52) U.S. Cl.
CPC ......... *H04N 5/23241* (2013.01); *H04N 5/332* (2013.01); *H04N 5/3696* (2013.01); *H04N 9/07* (2013.01)

(56) References Cited

U.S. PATENT DOCUMENTS

| | | | | |
|---|---|---|---|---|
| 2007/0225560 | A1* | 9/2007 | Avni | A61B 1/00006 600/118 |
| 2010/0284675 | A1 | 11/2010 | Machida et al. | |
| 2014/0266669 | A1* | 9/2014 | Fadell | G05B 19/042 340/501 |
| 2015/0035440 | A1* | 2/2015 | Spero | B60Q 1/04 315/153 |
| 2015/0076992 | A1* | 3/2015 | Walma | H05B 37/0218 315/153 |
| 2015/0127712 | A1* | 5/2015 | Fadell | G06Q 10/083 709/202 |
| 2015/0281556 | A1* | 10/2015 | Hamano | G02B 7/34 348/353 |
| 2015/0305119 | A1* | 10/2015 | Hidaka | H05B 37/0218 315/153 |

FOREIGN PATENT DOCUMENTS

| | | |
|---|---|---|
| JP | 2015-023306 A | 2/2015 |
| WO | 2009/091038 A1 | 7/2009 |
| WO | 2013/094115 A1 | 6/2013 |
| WO | 2013/179516 A1 | 12/2013 |
| WO | 2015/008584 A1 | 1/2015 |
| WO | 2015/064149 A1 | 5/2015 |

* cited by examiner

IMAGING DEVICE AND CONTROL METHOD

CROSS REFERENCE TO RELATED APPLICATIONS

This application is a U.S. National Phase of International Patent Application No. PCT/JP2016/066543 filed on Jun. 3, 2016, which claims priority benefit of Japanese Patent Application No. JP 2015-124105 filed in the Japan Patent Office on Jun. 19, 2015. Each of the above-referenced applications is hereby incorporated herein by reference in its entirety.

TECHNICAL FIELD

The present disclosure relates to an imaging device and a control method, and particularly relates to an imaging device and a control method that achieve low electric power consumption.

BACKGROUND ART

Patent Literature 1 proposes a time synchronization information calculation method as a method to synchronize the time to capture images by a plurality of cameras, and in this proposal, synchronization is established by converting the images captured actually.

CITATION LIST

Patent Literature

Patent Literature 1: WO 2013/094115

DISCLOSURE OF INVENTION

Technical Problem

However, in the proposal described in Patent Literature 1, it is necessary to perform imaging operation for the synchronization, and it is difficult to achieve low electric power consumption. Also, it is difficult to use the images used in the synchronization for the original imaging purpose, and the images used in the synchronization result in waste.

The present disclosure is made in view of such situation, and achieves low electric power consumption.

Solution to Problem

An imaging device of an aspect of the present technology includes: a pixel configured to receive light from a light source and convert a received light amount to a current value by utilizing photoelectric conversion; and a detection unit configured to detect a change of the current value of the pixel and issue an operation instruction in accordance with a detection result.

The pixel may be a pixel specialized to detect a brightness of an imaging environment, and may be a pixel that converts the received light amount to the current value, without electric power consumption, by utilizing the photoelectric conversion.

The detection unit can detect at least one of a light intensity, a light reception time, a blinking pattern, and a wavelength, as the change of the current value of the pixel.

The detection unit can detect an instruction trigger including a combination of changes of the current value of the pixel, by temporally changing light of a same color and frequency from the light source.

The detection unit can detect instruction triggers that include a combination of changes of the current value of the pixel and are different for different colors, by temporally changing light of different colors and frequencies from the light source.

The detection unit can detect, at a same time point, instruction triggers including a combination of changes of the current value of the pixel and having different frequencies, by causing light of different frequencies from the light source to be emitted at a same time.

The detection unit can issue a system operation start instruction to each unit other than the detection unit.

The detection unit can issue an instruction to transmit image data to another device.

The detection unit can issue an imaging instruction to a solid state imaging device including the pixel.

The detection unit can issue a transfer instruction of data including a combination of changes of the current value of the pixel.

A control method of an aspect of the present invention includes: detecting, by an imaging device, a change of a current value of a pixel configured to receive light from a light source and convert a received light amount to the current value by utilizing photoelectric conversion, and issuing an operation instruction in accordance with a detection result.

In an aspect of the present technology, the light from the light source is received, and the change of the current value of the pixel that converts the received light amount to the current value is detected by utilizing photoelectric conversion. Then, an operation instruction is performed in accordance with the detection result.

Advantageous Effects of Invention

According to the present technology, low electric power consumption is achieved.

The advantageous effects described in the present specification are merely exemplary and the advantageous effects of the present technology are not limited to the advantageous effects described in the present specification, but there may be additional advantageous effects.

MODE(S) FOR CARRYING OUT THE INVENTION

In the following, modes for carrying out the present disclosure (hereinafter, referred to as embodiment) will be described. Note that description will be made in the following order.
1. A first embodiment (an example of an imaging system)
2. A second embodiment (a variant example)
3. A third embodiment (a usage example of an image sensor)
4. A fourth embodiment (an example of an electronic device)
<First Embodiment (Example of Imaging System)>
<Schematic Configuration Example of Solid State Imaging Device>

Figure 1:
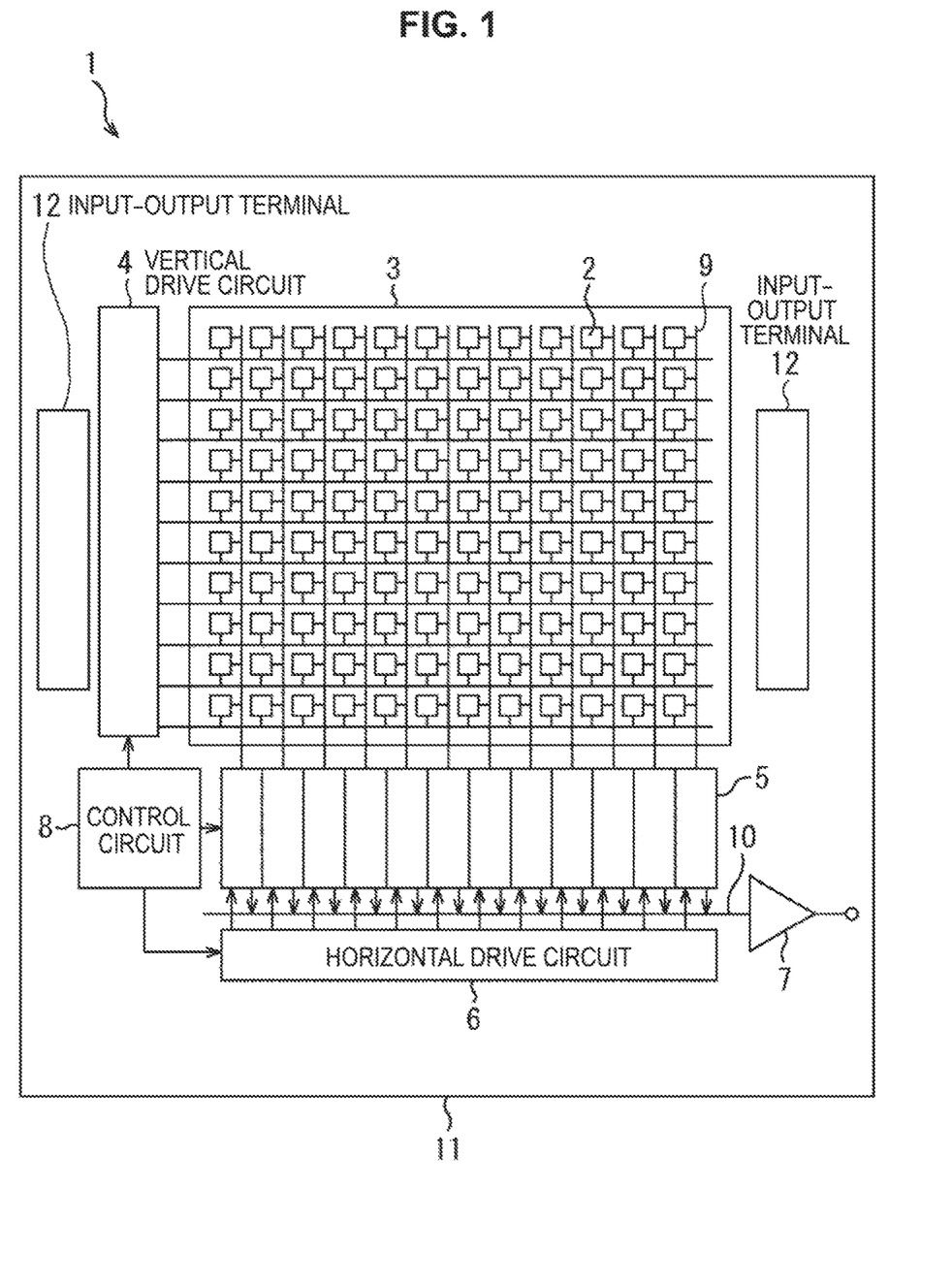
FIG. 1 is a block diagram illustrating a schematic configuration example of a solid state imaging device that employs the present technology.

FIG. 1 illustrates a schematic configuration example of an example of a complementary metal oxide semiconductor (CMOS) solid state imaging device employed in each embodiment of the present technology.

As illustrated in FIG. 1, a solid state imaging device (an element chip) 1 includes a pixel region (what is called an imaging region) 3 in which pixels 2 including a plurality of photoelectric conversion elements are arrayed regularly and two-dimensionally on a semiconductor substrate 11 (for example, a silicon substrate), and a peripheral circuit unit.

The pixels 2 include photoelectric conversion elements (for example, photo diodes), and a plurality of pixel transistors (what is called MOS transistors). The pixel transistors can be composed of three transistors including a transfer transistor, a reset transistor, and an amplification transistor for example, and can also be composed of four transistors by further adding a selection transistor. The equivalent circuit of each pixel 2 (unit pixel) is what a general pixel is like, and thus here its detailed description will be omitted.

Also, the pixels 2 may also have a pixel sharing configuration. The pixel sharing configuration includes a plurality of photo diodes, a plurality of transfer transistors, a shared floating diffusion, and another shared pixel transistor that is provided one by one.

The peripheral circuit unit includes a vertical drive circuit 4, column signal processing circuits 5, a horizontal drive circuit 6, an output circuit 7, and a control circuit 8.

The control circuit 8 receives an input clock and data that instructs an operation mode and the like, and outputs data such as internal information of the solid state imaging device 1. Specifically, the control circuit 8 generates a reference clock signal for the operation of the vertical drive circuit 4, the column signal processing circuits 5, and the horizontal drive circuit 6, as well as a control signal, on the basis of a vertical synchronization signal, a horizontal synchronization signal, and a master clock. Then, the control circuit 8 inputs these signals into the vertical drive circuit 4, the column signal processing circuits 5, and the horizontal drive circuit 6.

The vertical drive circuit 4 is configured with a shift register for example, and selects a pixel drive line, and supplies a pulse for driving the pixels 2 to the selected pixel drive line, and drives the pixels 2 row by row. Specifically, the vertical drive circuit 4 selectively scans each pixel 2 of the pixel region 3 sequentially in the vertical direction row by row, and supplies, to the column signal processing circuits 5, the pixel signal based on the signal electric charge generated in accordance with the received light amount in the photoelectric conversion element of each pixel 2 through a vertical signal line 9.

The column signal processing circuits 5 are arranged for each column of the pixels 2 for example, and perform signal processing, such as denoising, for each pixel column to the signal output from the pixels 2 of one row. Specifically, the column signal processing circuits 5 perform signal processing, such as correlated double sampling (CDS) for removing a fixed pattern noise inherent to the pixels 2, signal amplification, and analog/digital (A/D) conversion. Horizontal selection switches (not illustrated in the drawing) are connected between an output stage of the column signal processing circuits 5 and a horizontal signal line 10.

The horizontal drive circuit 6 is configured with a shift register for example, and selects each of the column signal processing circuits 5 in order, by sequentially outputting a horizontal scan pulse, and outputs a pixel signal to the horizontal signal line 10 from each of the column signal processing circuits 5.

The output circuit 7 performs signal processing to the signal sequentially supplied from each of the column signal processing circuits 5 through the horizontal signal line 10, and outputs the signal. For example, the output circuit 7 performs only buffering in some cases, and performs black level adjustment, column variation correction, various types of digital signal processing, and the like in other cases.

The input-output terminal 12 is provided to exchange signals with outside.
<Configuration Example of Imaging System>

Figure 2:
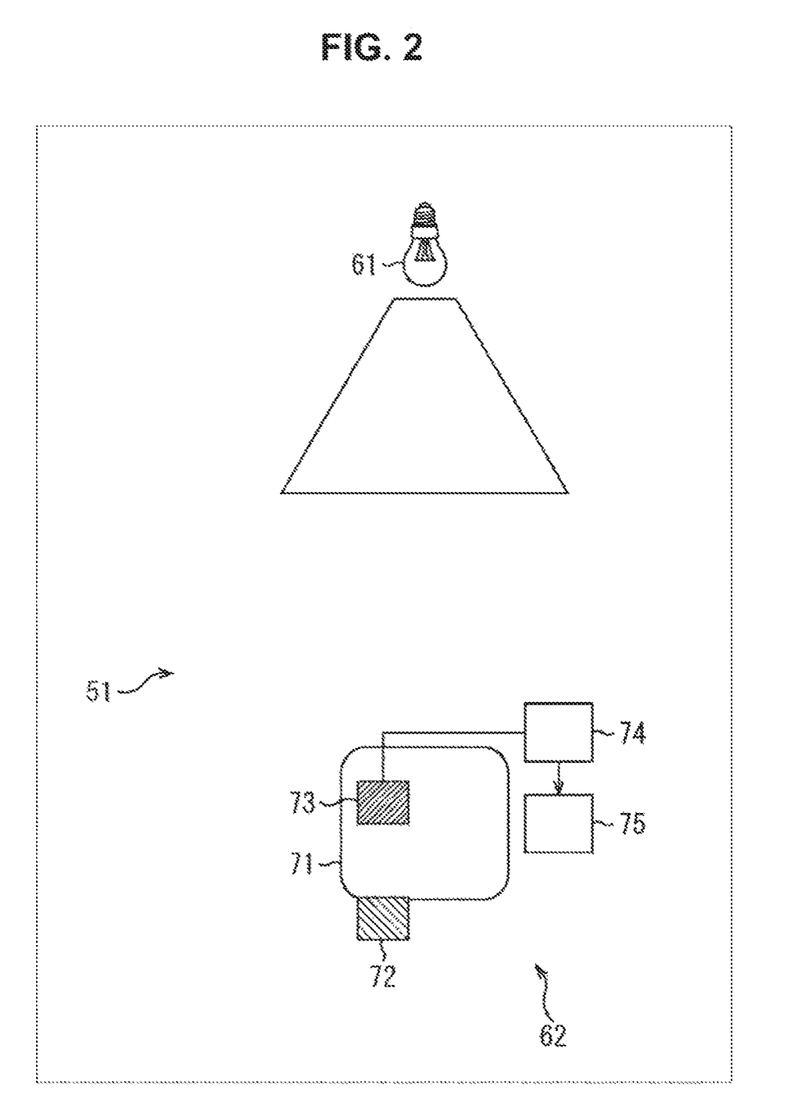
FIG. 2 is a block diagram illustrating an example of an imaging system that employs the present technology.

FIG. 2 is a block diagram illustrating an example of an imaging system that employs the present technology.

An imaging system 51 illustrated in FIG. 2 includes a light source 61 and an imaging device 62, for example. Note that the imaging system 51 also includes another imaging device 62 and another device (not depicted).

The light source 61 is a light source of a wavelength that can be received by an optical detector (OPD) pixel 73 which is a pixel that detects light exposure, and its light emission is controlled by a later described personal computer (PC) or the like.

The imaging device 62 includes a solid state imaging device 71, a memory 72, an OPD pixel 73, a detector 74, and a control target 75. The imaging device 62 is normally in a stop state (ultra-low electric power consumption state), except for the detector 74.

The solid state imaging device 71 basically has a similar configuration to the solid state imaging device 1, except for at least several pixels among the pixels 2 that are replaced with the OPD pixel 73. The location of the OPD pixel 73 is not limited particularly, as long as the OPD pixel 73 is within the pixel region 3.

The memory 72 is a fixed memory recorded at the time of production, and contains an ID unique to the imaging device 62.

The OPD pixel 73 is a pixel specialized to detect the brightness of an imaging environment, and converts the received light amount to a current value, without electric power consumption, by utilizing photoelectric conversion. The OPD pixel 73 is provided in advance to confirm and adjust the condition of imaging (light exposure time). The OPD pixel 73 has a wide dynamic range. Note that, when the OPD pixel 73 is not embedded, another pixel 2 can also be used, but in this case, an operation start of the solid state imaging device 71 is necessary.

As the electric current overflows in the OPD pixel 73, the detector 74 detects the change of the current value of the OPD pixel 73 (light intensity, light reception time, blinking pattern, etc.), and when detecting it, transmits an operation instruction corresponding to the detection result, to the control target 75 and the solid state imaging device 71.

The control target 75 is a target to which the detection unit 74 issues an operation instruction (controls) on the basis of the detection result from the detector 74. The target is another device (not depicted) included in the imaging system 51, or each unit of the imaging device 62, for example. Note that, when the operation instruction is issued to another device, a function such as wireless communication is provided.

Note that the solid state imaging device 71 may include the memory 72, the OPD pixel 73, the detector 74, and the control target 75.

<Process Example of Imaging System>

Figure 3:
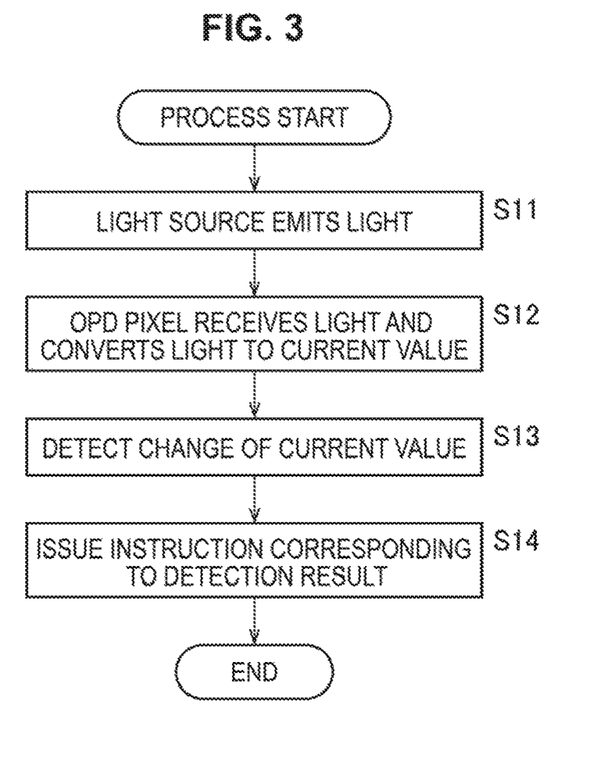
FIG. 3 is a flowchart for describing a process of an imaging system of FIG. 2.

Next, a process of the imaging system 51 will be described with reference to the flowchart of FIG. 3. The imaging device 62 is in a stop state, except for the detector 74.

In step S11, the light source 61 emits light. In step S12, the OPD pixel 73 receives light from the light source 61, and converts the received light amount to a current value.

In step S13, as the electric current overflows in the OPD pixel 73, the detector 74 detects a change of the current value of the OPD pixel 73 (light intensity, light reception time, blinking pattern, etc.).

In step S14, upon detection, the detector 74 transmits an instruction corresponding to the detection result to another device and each unit of the imaging device 62, which are the control target 75.

For example, in the case of the instruction issuance to the solid state imaging device 71, the solid state imaging device 71 restarts from the stop state by receiving the issued instruction, and starts operating in accordance with the received instruction. Also, for example, when the control target 75 receives the instruction, the control target 75 restarts from the stop state, and starts operating in accordance with the received instruction.

<Configuration Example of Imaging Device>

Figure 4:
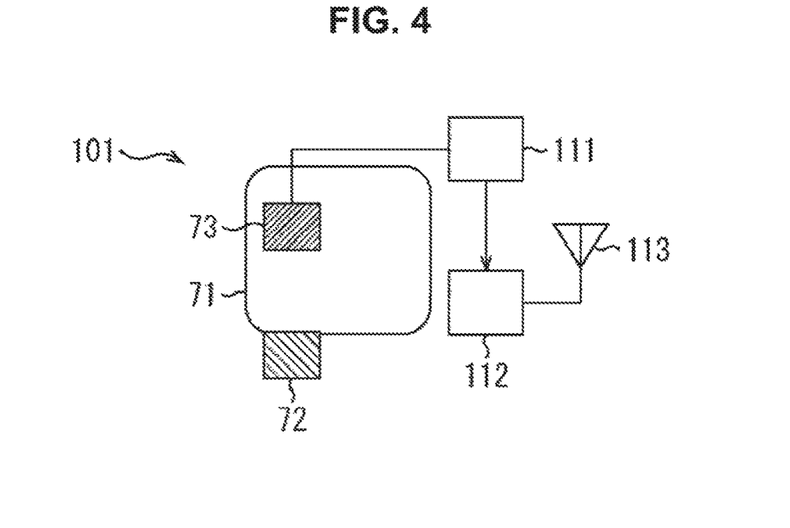
FIG. 4 is a block diagram illustrating an example of an imaging device that employs the present technology.

FIG. 4 is a block diagram illustrating another configuration example of the imaging device.

The imaging device 101 of FIG. 4 is different only in that the detector 74 is replaced by a trigger detector 111, that the control target 75 is removed, and that a wireless transmitter 113 with an antenna 114 is added, and except that, is configured basically similar to the imaging device 62 of FIG. 2, and thus the description is omitted.

The trigger detector 111 has a preset pattern of the change of the current value as a trigger (hereinafter, also referred to as instruction trigger), and detects the trigger in the change of the current value of the OPD pixel 73. For example, in the trigger detector 111 has a preset trigger, which is a trigger of imaging, a trigger of image data transmission, or a trigger of imaging and image data transmission. Also, a plurality of types of triggers may be set corresponding to operation. For example, a trigger 1 is set corresponding to imaging, and a trigger 2 is set corresponding to image data transmission.

The trigger detector 111 causes each corresponding unit to execute an instruction, by outputting the detected trigger as a predetermined instruction to each corresponding unit. For example, the trigger detector 111 causes the solid state imaging device 71 to perform imaging, when the trigger 1 is detected. For example, when the trigger 2 is detected, the trigger detector 111 causes the wireless transmitter 112 to transmit the image data captured by the solid state imaging device 71.

Upon receiving the instruction from the trigger detector 111, the wireless transmitter 112 starts operating, and transmits the image data from the solid state imaging device 71 responding to the instruction from the trigger detector 111, via the transmission antenna 114.

<Configuration Example of Imaging System>

Figure 5:
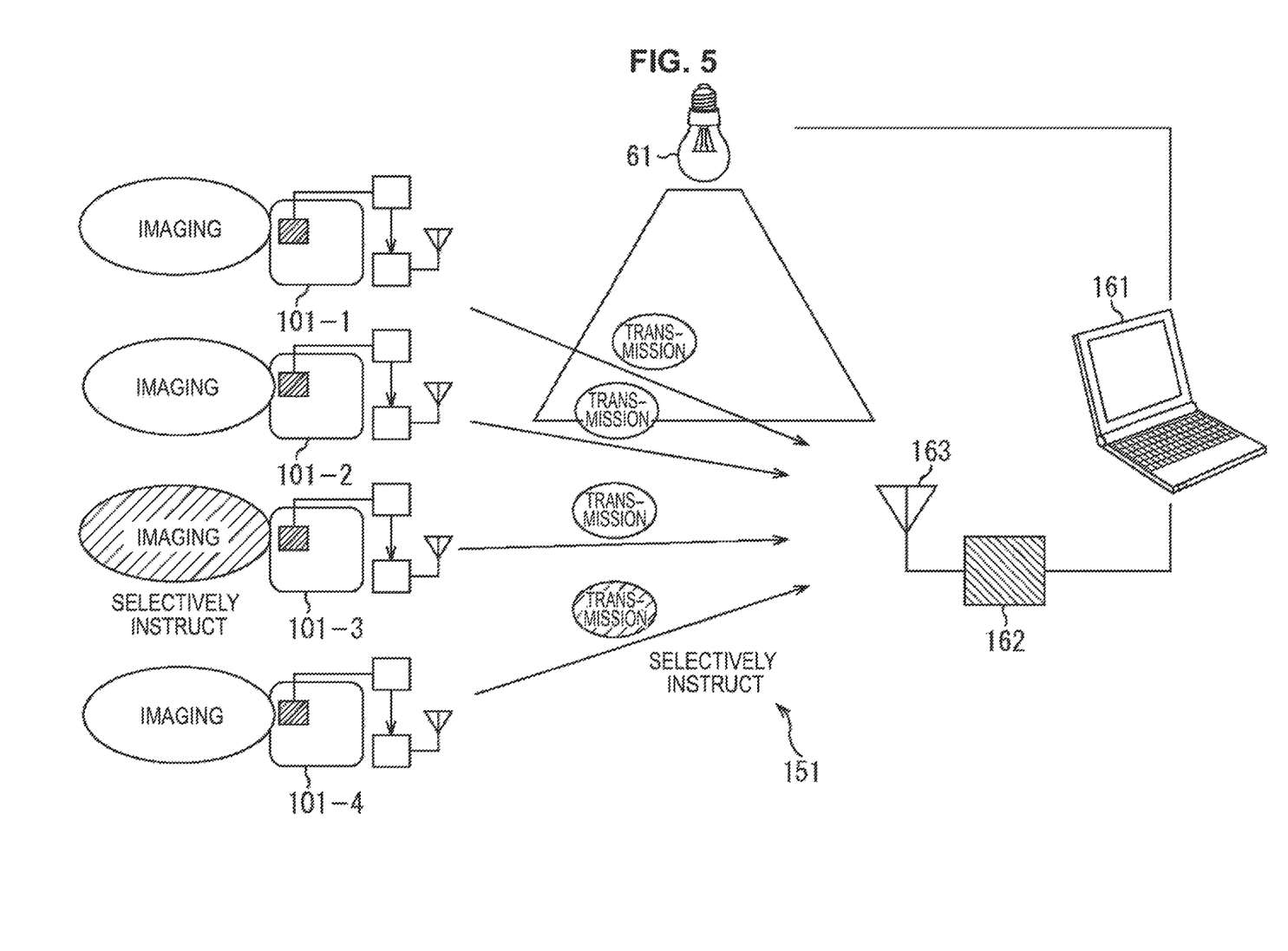
FIG. 5 is a block diagram illustrating an example of an imaging system that includes an imaging device of FIG. 4.

FIG. 5 is a diagram illustrating a configuration example of an imaging system 151 that employs the present technology.

The imaging system 151 includes the light source 61, imaging devices 101-1 to 101-4 of FIG. 4, and a PC 161.

Wireless communication is performed in the imaging system 151, but the imaging devices 101-1 to 101-4 all perform wireless communication in the same frequency band.

Thus, in the imaging system 151, each of the imaging devices 101-1 to 101-4 is configured to detect (recognize) an individual trigger, so that wireless communication is smoothly performed by selectively sending an instruction to a large number of imaging devices 101-1 to 101-4 from one light source 61.

The light source 61 can issue an instruction to one from among a large number, by combining a temporal intensity change and a wavelength (color) change.

Each of the imaging devices 101-1 to 101-4 has a preset trigger of imaging and a preset trigger of transmission, and receives the light from the light source 61, and detects the triggers from the change of the received current value. When detecting the trigger, the imaging devices 101-1 to 101-4 perform a process corresponding to the trigger.

The PC 161 includes a wireless receiver 162 with an antenna 163. The PC 161 controls the light source 61, and sets which imaging device 101 captures an image and which imaging device 101 transmits its image data, for example. The image data transmitted from the imaging devices 101-1 to 101-4 is received by the wireless receiver 162 via the antenna 163, and is supplied to the PC 161.

Note that FIG. 5 illustrates an example of the imaging system 151 in which the light source 61 selectively instructs imaging of the imaging device 101-3 and selectively instructs transmission of the image data of the imaging device 101-4.

<Process Example of Imaging System>

Figure 6:
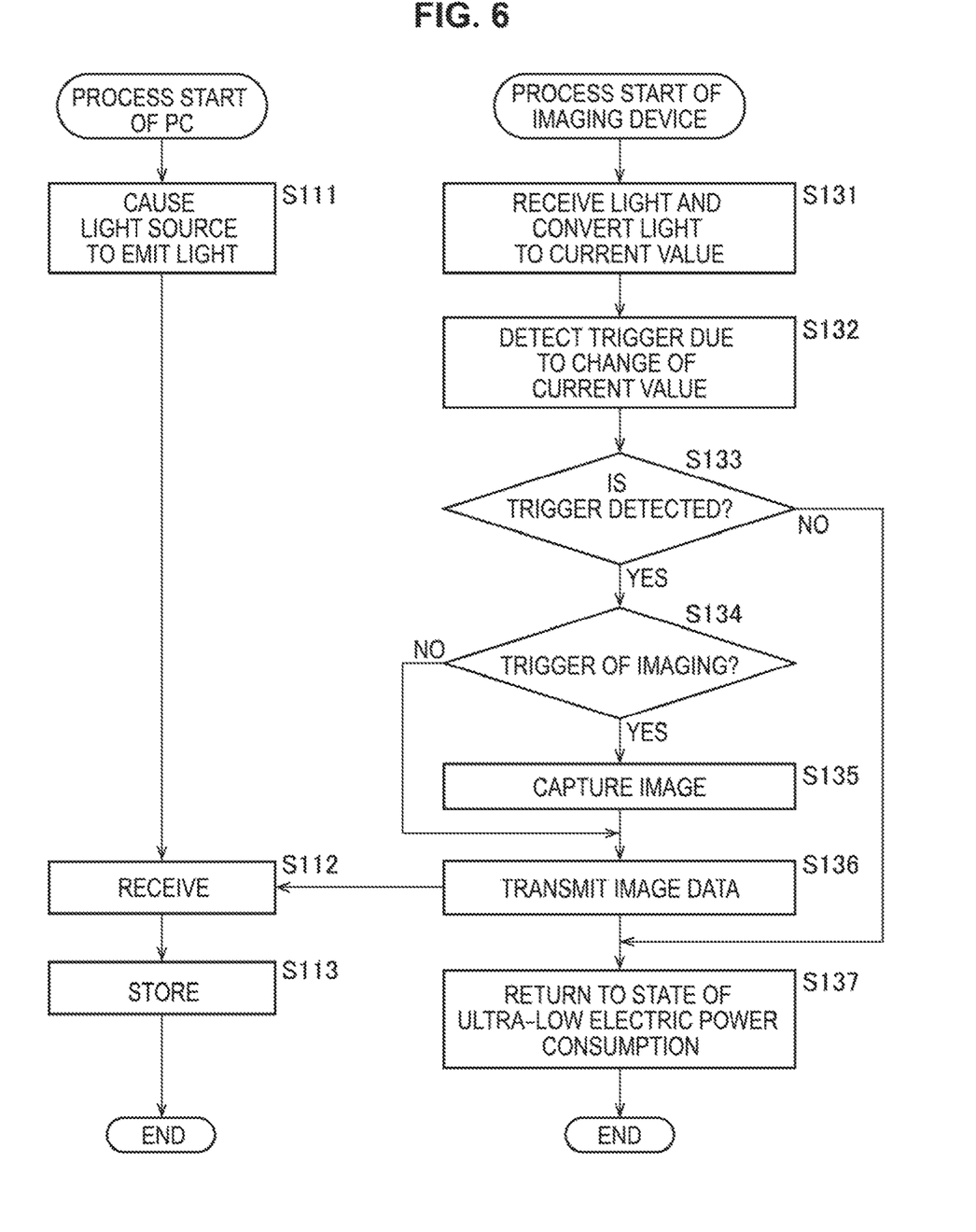
FIG. 6 is a flowchart for describing a process of an imaging system of FIG. 5.

A process of the imaging system of FIG. 5 will be described with reference to the flowchart of FIG. 6.

In step S111, the PC 161 controls the light source 61 and causes the light source 61 to emit light.

In step S131, each of the OPD pixels 73 of the imaging devices 101-1 to 101-4 receives light and converts the light to a current value. In step S132, each trigger detector 111 detects a trigger due to the change of each OPD pixel 73.

In step S133, each trigger detector 111 determines whether or not the trigger has been detected. If it is determined that the trigger has been detected in step S133, the process proceeds to step S134. For example, it is assumed that the trigger of imaging is detected in the trigger detector 111 of the imaging device 101-3, and the trigger of image data transmission is detected in the trigger detector 111 of the imaging device 101-4.

In step S134, the trigger detector 111 determines whether or not the detected trigger is the trigger of imaging. If it is determined that the detected trigger is the trigger of imaging in step S134, the process proceeds to step S135.

In step S135, the trigger detector 111 causes the solid state imaging device 71 to start operating and capture an image. In response to this, the solid state imaging device 71 starts operating and captures an image. The image data by the imaging is temporarily stored in an image memory (not depicted).

If it is determined that the detected trigger is not the trigger of imaging in step S134, the process proceeds to step S136. In step S136, the trigger detector 111 causes the wireless transmitter 112 to start operating and transmit the image data. In response to this, the wireless transmitter 112 starts operating and transmits the image data temporarily stored in the image memory (not depicted).

In step S112, the wireless receiver 162 of the PC 161 receives the image data from the wireless transmitter 112 via the antenna 163.

In step S113, the PC 161 records the received image data in the storage unit (not depicted).

After step S136, or when it is determined that the trigger is not detected in step S133, the process proceeds to step S137.

In step S137, the solid state imaging device 71 and the wireless transmitter 112 (each unit other than the trigger detector 111), which have started operating, among the imaging device 101, stop its operation, and return to the state of ultra-low electric power consumption.

By doing as described above, the electric power consumption is made lower in the state of ultra-low electric power consumption, except at the time of operation.

<Second Embodiment (Variant Example)>
<Example of Light Emission of Light Source>

Figure 7A:
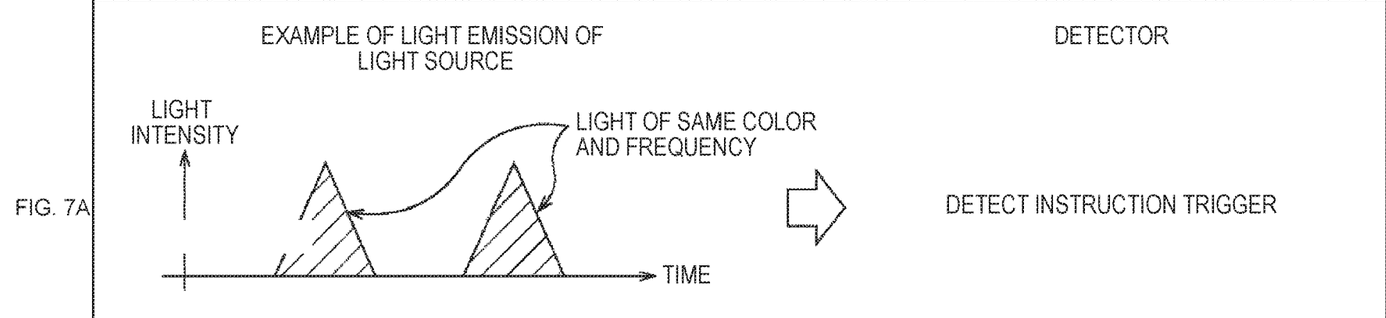
FIGS. 7A, 7B, and 7C are diagrams illustrating an example of light emission of a light source.
Figure 7B:
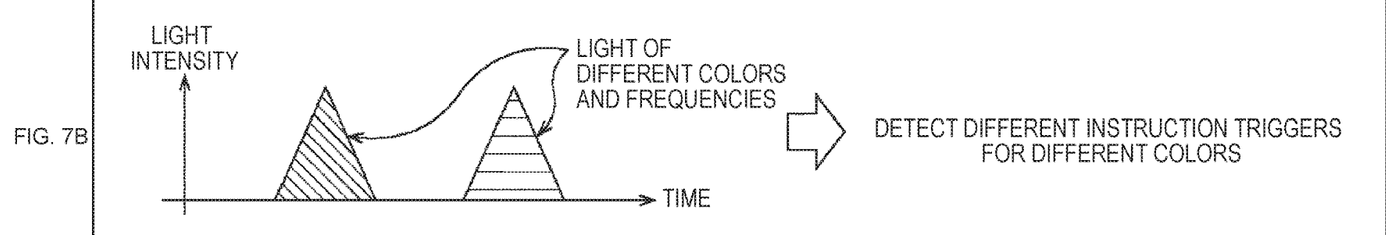
Figure 7C:
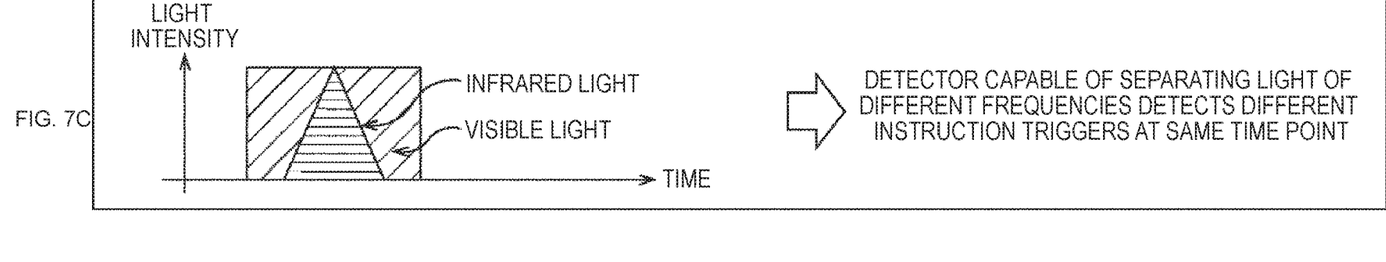

FIGS. 7A, 7B, and 7C are diagrams illustrating an example of light emission of a light source.

As illustrated in FIG. 7A, the trigger detector 111 can detect an instruction trigger, by temporally changing the light of the same color and frequency from the light source 61. Also, the trigger detector 111 can detect a plurality of instruction triggers, by setting a plurality of temporally changing patterns of the light.

As illustrated in FIG. 7B, the trigger detector 111 can detect different instruction triggers for different colors, by temporally changing the light of different colors and frequencies from the light source 61.

As illustrated in FIG. 7C, the trigger detector 111 capable of separating the light of different frequencies can detect different triggers at the same time point, by causing the light of different frequencies from the light source 61 (for example, a visible light and an infrared light (IR light)) to be emitted at the same time.

For example, imaging in the visible light and trigger detection in the infrared light can be performed simultaneously. Also, the wave detection for light exposure adjustment by the OPD pixel and the trigger detection from the infrared light can be performed simultaneously.

<Example of Instruction Trigger>

FIGS. 8A, 8B, 8C, and 8D are diagrams illustrating examples of the instruction trigger.

FIG. 8A to FIG. 8D are diagrams illustrating examples of the instruction trigger.

Figure 8A:
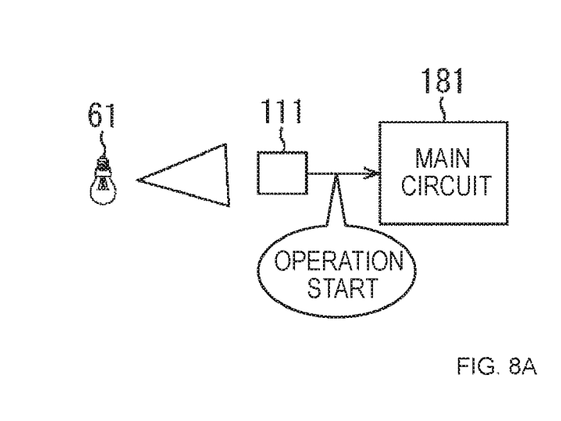
FIGS. 8A, 8B, 8C, and 8D are diagrams illustrating an example of an instruction trigger.

As illustrated in FIG. 8A, the trigger detector 111 can issue a system operation start instruction to a main circuit 181 of the imaging device 62, by an instruction trigger of a result of detecting a current value change from the light of the light source 61. The main circuit 181 is each unit other than the trigger detector 111, in the imaging device 62.

Figure 8B:
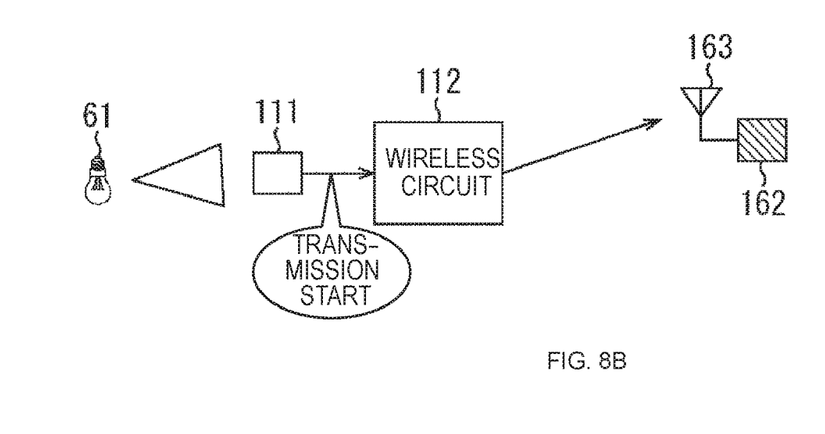

As illustrated in FIG. 8B, the trigger detector 111 can issue, to the wireless transmitter 112, an instruction to start transmission to the wireless receiver 162 that includes the antenna 163, by the instruction trigger of the result of detecting the change of the current value from the light of the light source 61, when the wireless transmitter 112 has started operating already.

Figure 8C:
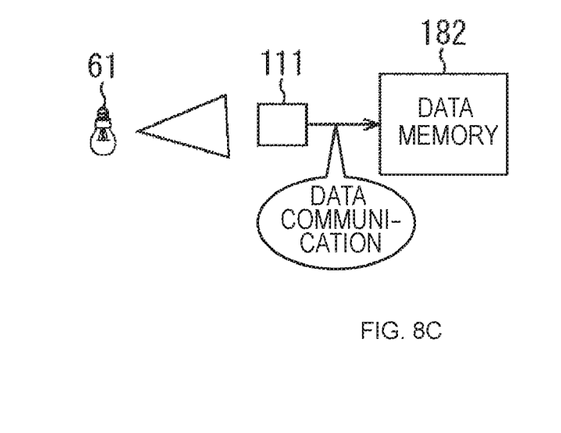

As illustrated in FIG. 8C, the trigger detector 111 can send, to a data memory 182 of the wireless transmitter 112, data of a combination of changes of the detected current value, by the instruction trigger of the result of detecting the change of the current value from the light of the light source 61, when the wireless transmitter 112 has started operating already.

Figure 8D:
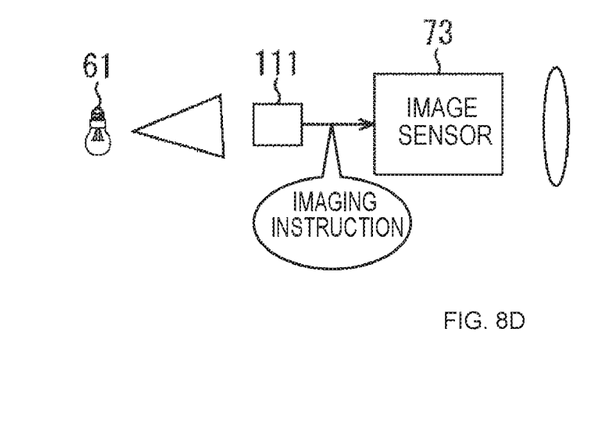

As illustrated in FIG. 8D, the trigger detector 111 can cause the solid state imaging device 71 to capture an image, by the instruction trigger of the result of detecting the change of the current value from the light of the light source 61, when the solid state imaging device 71 has started operating already.

As described above, according to the present technology, the OPD pixel is the illuminance sensor in the image sensor, and thus an additional mechanism is unnecessary, and cost performance is improved. Also, only the sensor with the illuminance meter and the detection mechanism are operated, and thus the electric power consumption is reduced as compared with standard imaging.

Also, when the trigger is generated by IR light, the brightness measurement for imaging and the trigger detection can be performed simultaneously. Further, when the trigger is generated by IR light, two types of triggers, such as an instruction from the light source or a brightness change by the illuminance meter, can be accepted.

<Third Embodiment (Usage Example of Image Sensor)>

Figure 9:
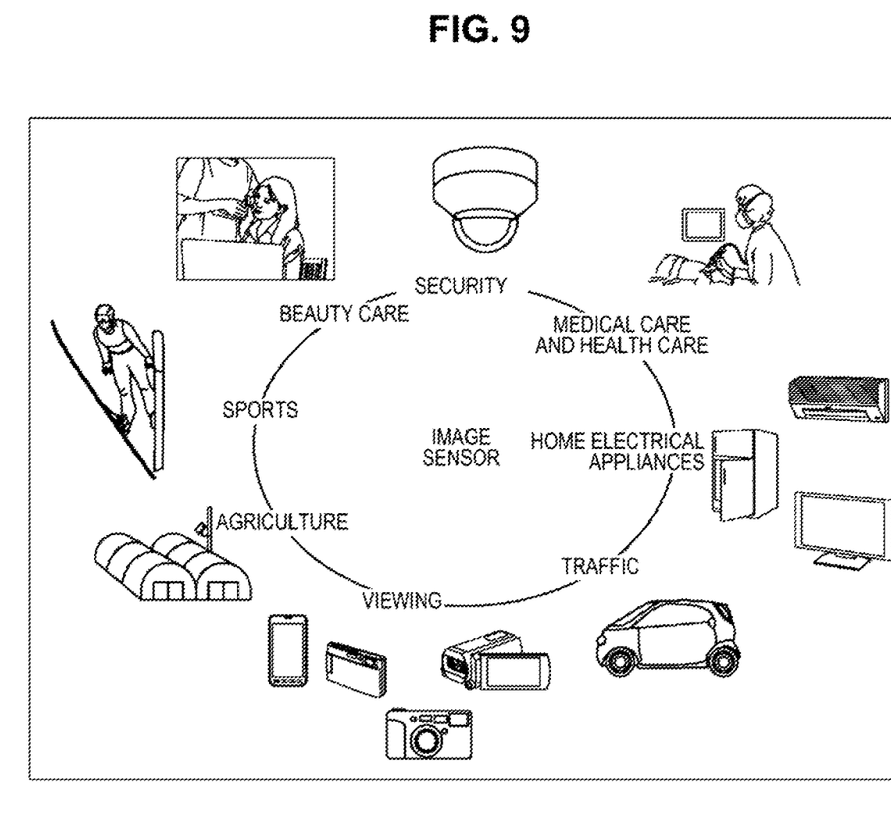
FIG. 9 is a diagram illustrating a usage example of an image sensor.

FIG. 9 is a diagram illustrating a usage example of the above-described solid-state imaging apparatus.

The solid-state imaging apparatus (image sensor) can be, for example, used in various cases in which light such as visible light, infrared light, ultraviolet light and X-ray is sensed as described below.

Devices that take images used for viewing, such as a digital camera and a portable appliance with a camera function.

Devices used for traffic, such as an in-vehicle sensor that takes images of the front and the back of a car, surroundings, the inside of the car, and the like, a monitoring camera that monitors travelling vehicles and roads, and a distance sensor that measures distances between vehicles and the like, which are used for safe driving (e.g., automatic stop), recognition of the condition of a driver, and the like.

Devices used for home electrical appliances, such as a TV, a refrigerator, and an air conditioner, to takes images of a gesture of a user and perform appliance operation in accordance with the gesture.

Devices used for medical care and health care, such as an endoscope and a device that performs angiography by reception of infrared light.

Devices used for security, such as a monitoring camera for crime prevention and a camera for personal authentication.

Devices used for beauty care, such as skin measurement equipment that takes images of the skin and a microscope that takes images of the scalp.

Devices used for sports, such as an action camera and a wearable camera for sports and the like.

Devices used for agriculture, such as a camera for monitoring the condition of the field and crops.

<Fourth Embodiment (Example of Electronic Device)>
<Configuration Example of Electronic Device>

Further, the present technology is not limited to application to the solid state imaging device, but is also applicable to an imaging device. Here, the imaging device means a camera system such as a digital still camera and a digital video camera, and an electronic device that has an imaging function such as a mobile phone. Note that the imaging device is a modular form provided in an electronic device, that is, a camera module, in some cases.

Here, a configuration example of an electronic device of a fourth embodiment of the present technology will be described with reference to FIG. 10.

Figure 10:
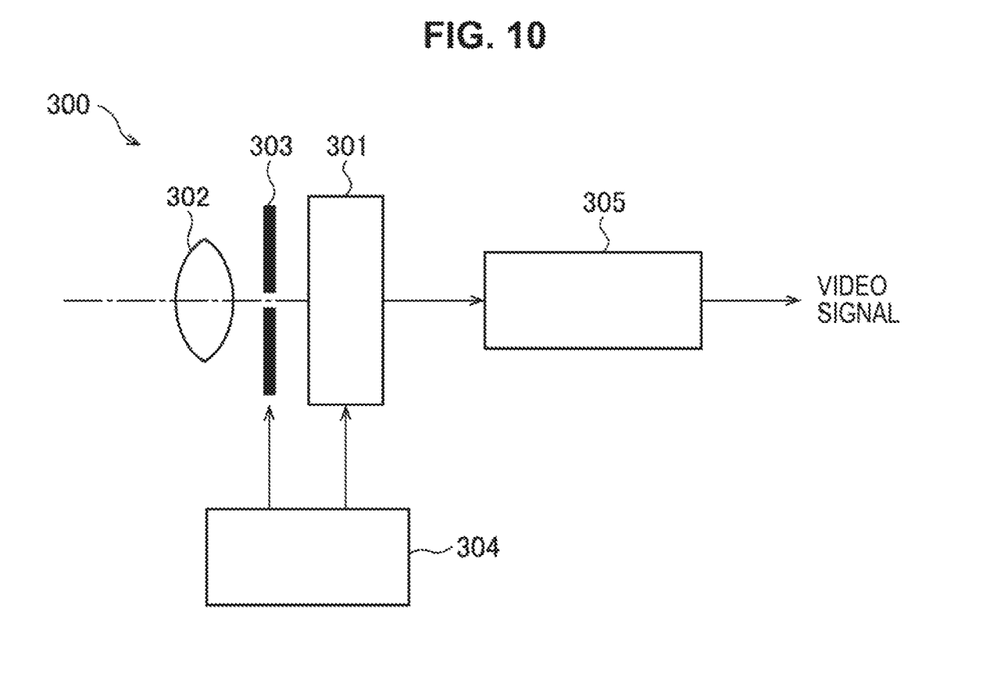
FIG. 10 is a block diagram illustrating a configuration example of an electronic device that employs the present technology.

An electronic device 300 illustrated in FIG. 10 includes an imaging device (an element chip) 301, an optical lens 302, a shutter device 303, a drive circuit 304, and a signal processing circuit 305. The above solid state imaging device 71 of the first embodiment of the present technology is provided as the solid state imaging device 301, and further includes the memory 72, the OPD pixel 73, the detector 74, and the control target 75 (not depicted). Thereby, the electric power of the solid state imaging device 301 of the electronic device 300 is reduced.

The optical lens 302 causes an image light (incoming light) from an imaging subject to form an image on the imaging capturing surface of the solid state imaging device 301. Thereby, the signal electric charge is accumulated in the solid state imaging device 301 for a certain period. The shutter device 303 controls a light radiation period and a light blocking period to the solid state imaging device 301.

The drive circuit 304 supplies a driving signal for controlling the signal transfer operation of the solid state imaging device 301 and the shutter operation of the shutter device 303. The solid state imaging device 301 transfers a signal, in accordance with the driving signal (timing signal) supplied from the drive circuit 304. The signal processing circuit 305 performs various types of signal processing to the signal output from the solid state imaging device 301. A video signal to which the signal processing is performed is stored in a storage medium such as a memory, and is output to a monitor. The shutter device 303, the drive circuit 304, and the signal processing circuit 305 are in a stop state, and start operating by the instruction from the detection circuit 74 as described above with reference to FIG. 3.

Note that an embodiment of the disclosure is not limited to the embodiments described above, and various changes and modifications may be made without departing from the scope of the disclosure.

Further, an element described as a single device (or processing unit) above may be divided and configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the disclosure.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the present technology may also be configured as below.

(1)

An imaging device including:

a pixel configured to receive light from a light source and convert a received light amount to a current value by utilizing photoelectric conversion; and a detection unit configured to detect a change of the current value of the pixel and issue an operation instruction in accordance with a detection result.

(2)

The imaging device according to (1), in which the pixel is a pixel specialized to detect a brightness of an imaging environment, and is a pixel that converts the received light amount to the current value, without electric power consumption, by utilizing the photoelectric conversion.

(3)

The imaging device according to (1) or (2), in which the detection unit detects at least one of a light intensity, a light reception time, a blinking pattern, and a wavelength, as the change of the current value of the pixel.

(4)

The imaging device according to (3), in which the detection unit detects an instruction trigger including a combination of changes of the current value of the pixel, by temporally changing light of a same color and frequency from the light source.

(5)

The imaging device according to (3), in which the detection unit detects instruction triggers that include a combination of changes of the current value of the pixel and are different for different colors, by temporally changing light of different colors and frequencies from the light source.

(6)

The imaging device according to (3), in which the detection unit detects, at a same time point, instruction triggers including a combination of changes of the current value of the pixel and having different frequencies, by causing light of different frequencies from the light source to be emitted at a same time.

(7)

The imaging device according to any one of (1) to (6), in which the detection unit issues a system operation start instruction to each unit other than the detection unit.

(8)

The imaging device according to any one of (1) to (6), in which the detection unit issues an instruction to transmit image data to another device.

(9)

The imaging device according to any one of (1) to (6), in which the detection unit issues an imaging instruction to a solid state imaging device including the pixel.

(10)

The imaging device according to any one of (1) to (6), in which the detection unit issues a transfer instruction of data including a combination of changes of the current value of the pixel.

(11)

A control method including:

detecting, by an imaging device, a change of a current value of a pixel configured to receive light from a light source and convert a received light amount to the current value by utilizing photoelectric conversion, and issuing an operation instruction in accordance with a detection result.

REFERENCE SIGNS LIST 1 solid state imaging device
2 pixel
3 pixel region
11 semiconductor substrate
51 imaging system
61 light source
62 imaging device
71 solid state imaging device
72 memory
73 OPD pixel
74 detector
75 control target
101, 101-1 to 101-4 imaging device
111 trigger detector
112 wireless transmitter
113 antenna
151 imaging system
161 PC
162 wireless receiver
163 antenna
300 electronic device
301 solid state imaging device
302 optical lens
303 shutter device
304 drive circuit
305 signal processing circuit

The invention claimed is:

1. An imaging device, comprising:
a pixel configured to:
receive first light from a light source; and
convert the received first light to a current value of the pixel by photoelectric conversion; and
a detector configured to:
detect a change of the current value of the pixel;
detect an instruction trigger based on:
the change of the current value of the pixel, and
a temporal change of the received first light of a same color and a same frequency from the light source,
wherein the instruction trigger includes a first combination of changes of the current value of the pixel; and
issue an operation instruction based on the detected instruction trigger.

2. The imaging device according to claim 1, wherein the pixel is further configured to detect a brightness of an imaging environment, and the conversion of the received first light to the current value is without electric power consumption.

3. The imaging device according to claim 2, wherein the detector is further configured to detect at least one of a light intensity, a light reception time, a blinking pattern, or a wavelength, as the change of the current value of the pixel.

4. The imaging device according to claim 3, wherein
the pixel is further configured to receive second light from the light source,
the detector is further configured to detect instruction triggers that are different for different colors, based on a temporal change of the second light of different colors and different frequencies from the light source, and
the instruction triggers include a second combination of changes of the current value of the pixel.

5. The imaging device according to claim 3, wherein
the pixel is further configured to receive second light from the light source,
the detector is further configured to detect, at a same time point, instruction triggers having different frequencies, based on emission of the second light of different frequencies from the light source at a same time, and
the instruction triggers include a second combination of changes of the current value of the pixel.

6. The imaging device according to claim 2, further comprising a main circuit, wherein
the detector is further configured to issue a system operation start instruction to the main circuit, and
the main circuit is different from the detector.

7. The imaging device according to claim 2, wherein the detector is further configured to issue an instruction to transmit image data to a device.

8. The imaging device according to claim 2, further comprising a solid state imaging device that includes the pixel, wherein the detector is further configured to issue an imaging instruction to the solid state imaging device.

9. The imaging device according to claim 2, wherein the detector is further configured to issue a transfer instruction of data including the first combination of changes of the current value of the pixel.

10. A control method, comprising:
receiving, by a pixel of an imaging device, light from a light source;
converting, by the pixel, the received light to a current value of the pixel by photoelectric conversion;
detecting, by a detector of the imaging device, a change of the current value of the pixel;
detecting, by the detector, an instruction trigger based on:
the change of the current value of the pixel, and
a temporal change of the received light of a same color and a same frequency from the light source,
wherein the instruction trigger includes a combination of changes of the current value of the pixel; and
issuing, by the detector, an operation instruction based on the detected instruction trigger.

* * * * *